United States Patent
Guo et al.

(10) Patent No.: US 11,654,572 B2
(45) Date of Patent: May 23, 2023

(54) ROBOT MAPPING METHOD AND ROBOT AND COMPUTER READABLE STORAGE MEDIUM USING THE SAME

(71) Applicant: UBTECH ROBOTICS CORP LTD, Shenzhen (CN)

(72) Inventors: Rui Guo, Shenzhen (CN); Kun Xie, Shenzhen (CN); Chenchen Jiang, Shenzhen (CN); Zhichao Liu, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 526 days.

(21) Appl. No.: 16/935,231

(22) Filed: Jul. 22, 2020

(65) Prior Publication Data
US 2021/0197388 A1    Jul. 1, 2021

(30) Foreign Application Priority Data
Dec. 31, 2019    (CN) .......................... 201911416830.1

(51) Int. Cl.
*B25J 9/16*    (2006.01)
*B25J 13/08*    (2006.01)

(52) U.S. Cl.
CPC ............. *B25J 9/1697* (2013.01); *B25J 9/161* (2013.01); *B25J 9/1653* (2013.01); *B25J 9/1664* (2013.01); *B25J 13/08* (2013.01)

(58) Field of Classification Search
CPC ........ B25J 9/1697; B25J 9/161; B25J 9/1653; B25J 9/1664; B25J 13/08; G05D 2201/02; G05D 1/0234; G05D 1/0274; G06T 11/206; G06T 2210/61; G06F 18/241; G06V 20/10; G06V 30/224; G06V 10/245; G06V 2201/09
See application file for complete search history.

(56) References Cited

U.S. PATENT DOCUMENTS

2020/0103915 A1*    4/2020    Holz .................. G01C 21/3848

FOREIGN PATENT DOCUMENTS

| CN | 108634874 A | 10/2018 |
|---|---|---|
| CN | 109976325 A | 7/2019 |

* cited by examiner

*Primary Examiner* — Robert T Nguyen (57) ABSTRACT

The present disclosure provides a robot mapping method as well as a robot and a computer readable storage medium using the same. The method includes: detecting a marker with identification information capable of being identified by the robot in a current scene; determining whether the detected marker meets a preset condition; and mapping the current scene based on the marker, if the detected marker meets the preset condition. The robot mapping method can not only map the current scene, but also effectively reduce the difficulty of loops and the number of false loops.

20 Claims, 9 Drawing Sheets

ROBOT MAPPING METHOD AND ROBOT AND COMPUTER READABLE STORAGE MEDIUM USING THE SAME

CROSS REFERENCE TO RELATED APPLICATION

The present disclosure claims priority to Chinese Patent Application No. 201911416830.1, filed Dec. 31, 2019, which is hereby incorporated by reference herein as if set forth in its entirety.

BACKGROUND

1. Technical Field

The present disclosure relates to navigation technology, and particularly to a robot mapping method as well as a robot and a computer readable storage medium using the same.

2. Description of Related Art

In some large scenes such as supermarkets, airports and computer rooms, it is often necessary to map the current scene to provide better navigation and positioning services.

At present, it usually uses a device equipped with, for example, laser or visional sensors, to perform loop mapping on the current scene so to provide navigation and positioning services. However, due to the scene of supermarkets, airports, and computer rooms is usually large and the surrounding environment thereof is highly similar, it will be prone to the difficulties and fails of loops while using the device to map the current scene.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise. In the embodiments of the present disclosure, all directional indicators (e.g., up, down, left, right, front, and back) are only for explaining the relative positional relationship, the movement condition, and the like between the components in a specific posture (as shown in the drawings). If the specific posture changes, the directional indications change accordingly. In addition, the terms "include" and "have" and any variations thereof are intended to cover non-exclusive inclusions. For example, a process, method, system, product, or device that includes a series of steps or units is not limited to the listed steps or units, but optionally further includes steps or units that are not listed, or optionally further includes other steps or units inherent to these processes, methods, products, or devices.

The "embodiment" referred to in the present disclosure means that, the specific features, structures, or characteristics described in the descriptions of an embodiment can be included in at least one embodiment of the present disclosure. The appearance of the term in various places of the present disclosure does not necessarily refer to the same embodiment, nor necessarily refer to an independent or alternative embodiment mutually exclusive with other embodiments. Those skilled in the art understand explicitly and implicitly that, the embodiment described in the present disclosure can be combined with the other embodiments.

The present disclosure will be described in detail below with reference to the drawings and embodiments.

Figure 1:
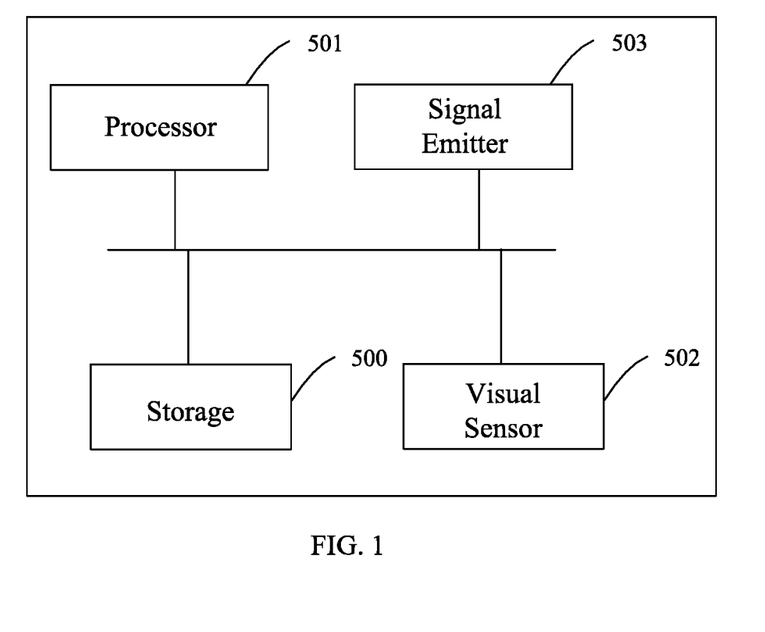
FIG. 1 is a schematic block diagram of an embodiment of a robot with mapping functions according to the present disclosure.

FIG. 1 is a schematic block diagram of an embodiment of a robot with mapping functions according to the present disclosure. In this embodiment, a robot with mapping functions is provided. As shown in FIG. 1, the robot includes a storage 500 a processor 501, a visual sensor 502, and a signal emitter 503.

Figure 2:
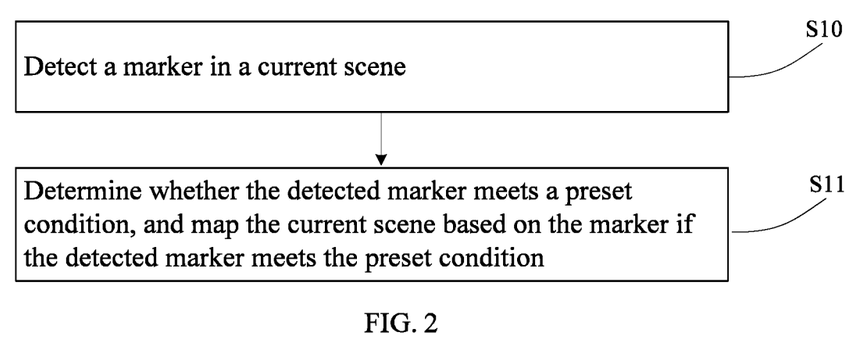
FIG. 2 is a flow chart of a first embodiment of a robot mapping method according to the present disclosure.

In this embodiment, the storage 500 is stored with instructions, and the processor 501 is coupled to the storage 500 to retrieve the instructions and execute a robot mapping method as shown in FIG. 2 according to the instructions.

In which, the instructions include:

instructions for detecting a marker in a current scene through the visual sensor, wherein the marker has identification information capable of being identified by the robot;

instructions for identifying the identification information of the marker, and retrieving the marker in a mapping database based on the identification information; and instructions for inputting the identification information of the marker into the mapping database and obtaining a loop release time for the first detected marker, in response to the identification information being not retrieved from the mapping database;

instructions for determining whether the detected marker meets a preset condition; and instructions for mapping the current scene based on the marker, in response to the detected marker meeting the preset condition.

In other embodiments, the instructions further include instructions for the processor 501 to execute the robot mapping method as shown in FIG. 3-FIG. 8 according to the instructions.

In which, the processor 501 may also be referred to as a CPU (central processing unit). The processor 501 may be an integrated circuit chip with signal processing capabilities. The processor 501 may also be a general purpose processor, a digital signal processor (DSP), an application specific integrated circuit (ASIC), a field programmable gate array (FPGA), or be other programmable logic device, a discrete gate, a transistor logic device, and a discrete hardware component. The general purpose processor may be a microprocessor, or the processor may also be any conventional processor.

The storage 500 may be a memory stick, a TF card, or the like, which can store all information in the robot with mapping functions, where the information includes the input raw data, computer programs, intermediate execution results, and final execution results. It stores and retrieves information according to the locations specified by the controller. With the storage 500, the robot with mapping functions can have a memory function to ensure normal operation. The storage 500 in the robot with mapping functions can be divided into a main memory (i.e., internal memory) and an auxiliary memory (i.e., external memory) according to usage, and there are also classification methods into an external memory and an internal memory. The external storage is usually a magnetic medium, an optical disk, or the like, which can store information for a long time. The internal memory refers to the storage components on the motherboard, which is used to store the currently executing data and programs, but only used to temporarily store programs and data which will be lost after power off.

The robot with mapping functions further includes other components, which can be, as an example, the same as or similar to the other components and functions of the robot with mapping functions in the prior art, and are not repeated herein.

FIG. 2 is a flow chart of a first embodiment of a robot mapping method according to the present disclosure. In this embodiment, a mapping method for a robot is provided. The method is a computer-implemented method executable for a processor. In one embodiment, the method may be implemented through and applied to the robot shown in FIG. 1 or implemented through and applied to a computer readable storage medium shown in FIG. 9. As shown in FIG. 2, the method includes the following steps.

S10: detecting a marker in a current scene.

The marker has identification information, where the identification information can be identified by the robot. In order to accurately and efficiently build a navigation map of large scene and highly similar environment, some special markers are placed at specific positions in the current scene in advance, and all the markers are sequentially numbered to form corresponding identification (ID) information. At the same time, a mapping mode of the robot is activated to detect the markers in the current scene. In this embodiment, the marker is detected through a visual sensor of the robot, for example, a camera. Compared with the prior art that directly performs mapping on the current scene through a device equipped with, for example, laser or visional sensors, the mapping method performs mapping based on the markers in the current scene, which is capable of effectively reducing the difficulty of loops and the number of false loops.

It should be noted that, in the present disclosure, the robot can be used to map the current scene, and a mapping mode is installed in the system of the robot. The functions of the mapping mode can be, as an example, the same as or similar to those in the prior art and can achieve the same or similar technical effects, which will not be repeated herein.

In this embodiment, the above-mentioned specific position can be a place lacking in texture, for example, the narrow and hidden toilet passage in a shopping mall, an empty and tall hall in an airport, and the like. The specific position can also be a scene with a similar environment, for example, the entrances of similar shops in a shopping mall, the places around escalators, or the entrances of the aisles or the places on the cabinets in a computer room with servers disposed in a similar manner.

In this embodiment, the above-mentioned marker is an object with the identification information. The identification information is an identification code or an identification signal, where the identification code includes a two-dimensional code, and the identification signals can be a WIFI signal, a Bluetooth signal, a UWB signal, or an RFID signal which is emitted through a signal emitter of the robot. As an example, different specific positions of the current scene can be deployed with only one kind of marker, for instance, deploying an object including a two-dimensional code as a marker at each specific position in the current scene; alternatively, deploying an object including a two-dimensional code as a marker at some specific positions in the current scene, while deploying an object emitting a WIFI signal, a Bluetooth signal, a UWB signal, and an RFID signal as a marker at other specific positions in the current scene, which is not limited in this embodiment. It should be noted that, it will be sufficient to set only one marker at one specific position in the current scene.

Figure 3:
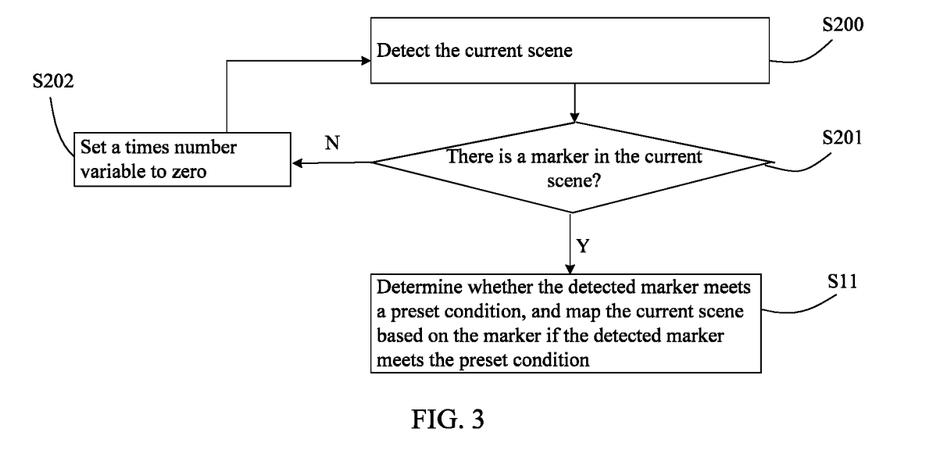
FIG. 3 is a flow chart of an example of step S10 of the robot mapping method of FIG. 2.

FIG. 3 is a flow chart of an example of step S10 of the robot mapping method of FIG. 2. As shown in FIG. 3, the step S10 in FIG. 2 includes the following steps.

S200: detecting the current scene.

In this embodiment, in the case that the marker is the object with the two-dimensional code, one frame of image at the current specific position is obtained, where the frequency of obtaining the image can be 10 frames/second. In the case that the marker is the object emitting the identification signal, the identification signal is detected, where the detection frequency can be 1 time/second. As an example, the method to detect the marker can be the detection method in the prior art, and the same or similar technical effects can be achieved, which will not be repeated herein.

S201: determining whether there is a marker in the current scene.

In this embodiment, in the case that the marker is the object with the two-dimensional code, it is determined whether there is a marker in the obtained image at the current specific position; in the case that the marker is the object emmiting the identification signal, it is determined whether the identification signal can be detected. If no, step S202 is executed; otherwise, step S11 is executed.

S202: setting a times number variable to zero.

In this embodiment, after the times number (number of times) variable is set to zero, step S200 is re-executed.

S11: determining whether the detected marker meets a preset condition, and mapping the current scene based on the marker if the detected marker meets the preset condition.

In this embodiment, the preset condition includes at least one of a distance condition, a times number condition, and a time condition.

In which, the distance condition refers to that the distance between the marker and the robot is smaller than the distance threshold, and as an example, the distance threshold can be 2 meters.

In which, the times number condition refers to that the times number variable is greater than a times number threshold, where the times number variable refers to the number of times that the marker(s) meeting the distance condition are continuously detected, and as an example, the times number threshold can be 3.

In which, the time condition refers to that the time difference between the current loop release time after the times number condition is met and a last loop release time is greater than the time threshold, where the last loop release time caused by the marker is the time when the system of the robot releasing the loop to a laser or visual SLAM after meeting the distance condition, the times number condition and the time condition for the latest time. As an example, the time threshold can be 300 seconds, that is, the loop processing operation triggered by the marker is only responded once within 5 minutes so as to avoid the problem of frequent loops that causes the overload of the system of the robot and affects the quality of mapping, so that an environmental map of better quality can be built through the method, thereby providing a more accurate navigation and positioning service.

In this embodiment, the robot mapping method detects the marker with the identification information can be identified by the robot in the current scene, determines whether the detected marker meets the preset condition, and maps the current scene based on the marker if the detected marker meets the preset condition. Because the method is to detect the marker in the current scene and map the current scene, compared with the prior art that directly perform mapping on the current scene through a device equipped with, for example, laser or visional sensors, it is capable of effectively reducing the difficulty of loops and the number of false loops. At the same time, because the above-mentioned method performs the loop processing after the detected marker meets the preset condition so as to map the current scene, which can effectively avoid the problem of frequent loops that causes the overload of the system of the robot and affects the quality of mapping, so that an environmental map of better quality can be built through the method, thereby providing a more accurate navigation and positioning service.

Figure 4:
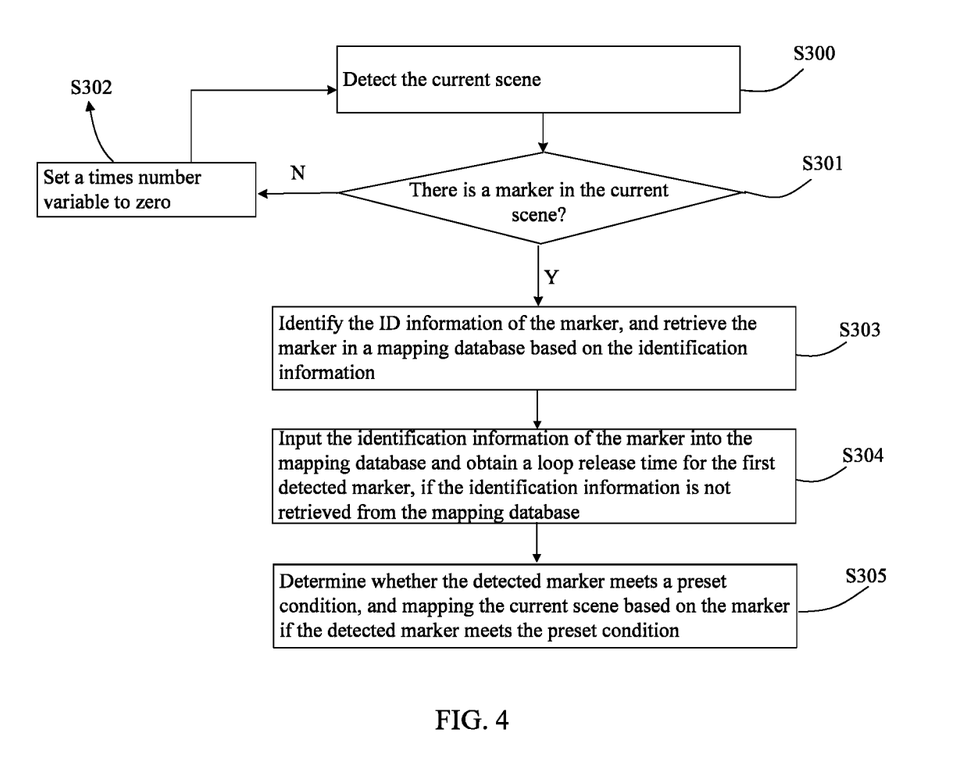
FIG. 4 is a flow chart of a second embodiment of a robot mapping method according to the present disclosure.

FIG. 4 is a flow chart of a second embodiment of a robot mapping method according to the present disclosure. In this embodiment, a mapping method for a robot is provided. As shown in FIG. 4, the method includes the following steps.

S300: detecting the current scene.

S301: determining whether there is a marker in the current scene.

In this embodiment, if there is no marker, step S302 is executed; otherwise, step S303 is executed.

S302: setting a times number variable to zero.

In this embodiment, steps S300-S302 are the same as or similar to steps S200-S202 in the above-mentioned embodiment, respectively, and the same or similar technical effects can be achieved, which will not be repeated herein.

S303: identifying the identification (ID) information of the marker, and retrieving the marker in a mapping database based on the identification information.

In this embodiment, if the marker is detected in step S301, the marker is identified to obtain the corresponding identification information, and then the ID information is retrieved in the current mapping database db.

S304: inputting the identification information of the marker into the mapping database and obtaining a loop release time for the first detected marker, if the identification information is not retrieved from the mapping database.

In this embodiment, the mapping database db contains two fields: the marker ID field (with the variable name: id) and the last system loop release time field (with the variable name: last_loop_pub_time) triggered by the marker. The last loop release time field needs to be initialized to a system default value when the marker is first detected and identified. As an example, the system default value can be set to the loop release time of the first detected marker, and the system default value can be updated in sequence by each system loop release time triggered by the marker, so that the last loop release time field finally stores the latest loop release time triggered by the marker.

S305: determining whether the detected marker meets a preset condition, and mapping the current scene based on the marker if the detected marker meets the preset condition.

In this embodiment, step S305 is the same as or similar to step S11 in the above-mentioned embodiment, and the same or similar technical effect can be achieved, which will not be repeated herein.

In this embodiment, the robot mapping method detects the current scene and determines whether there is a marker in the current scene, identifies the identification information of the marker and retrieves the marker in the mapping database based on the identification information if there is a marker in the current scene, inputs the identification information of the marker into the mapping database and obtains the loop release time for the first detected marker if the identification information is not retrieved from the mapping database, determines whether the detected marker meets the preset condition, and mapping the current scene based on the marker if the detected marker meets the preset condition. In this embodiment, the marker with the identification information can be identified by the robot in the current scene is detected and then the mapping is performed. Compared with the prior art that directly perform mapping on the current scene through a device equipped with, for example, laser or visional sensors, it is capable of effectively reducing the difficulty of loops and the number of false loops. In addition, because the above-mentioned method performs the loop processing after the detected marker meets the preset condition so as to map the current scene, which can effectively avoid the problem of frequent loops that causes the overload of the system of the robot and affects the quality of mapping, so that an environmental map of better quality can be built through the method, thereby providing a more accurate navigation and positioning service.

Figure 5:
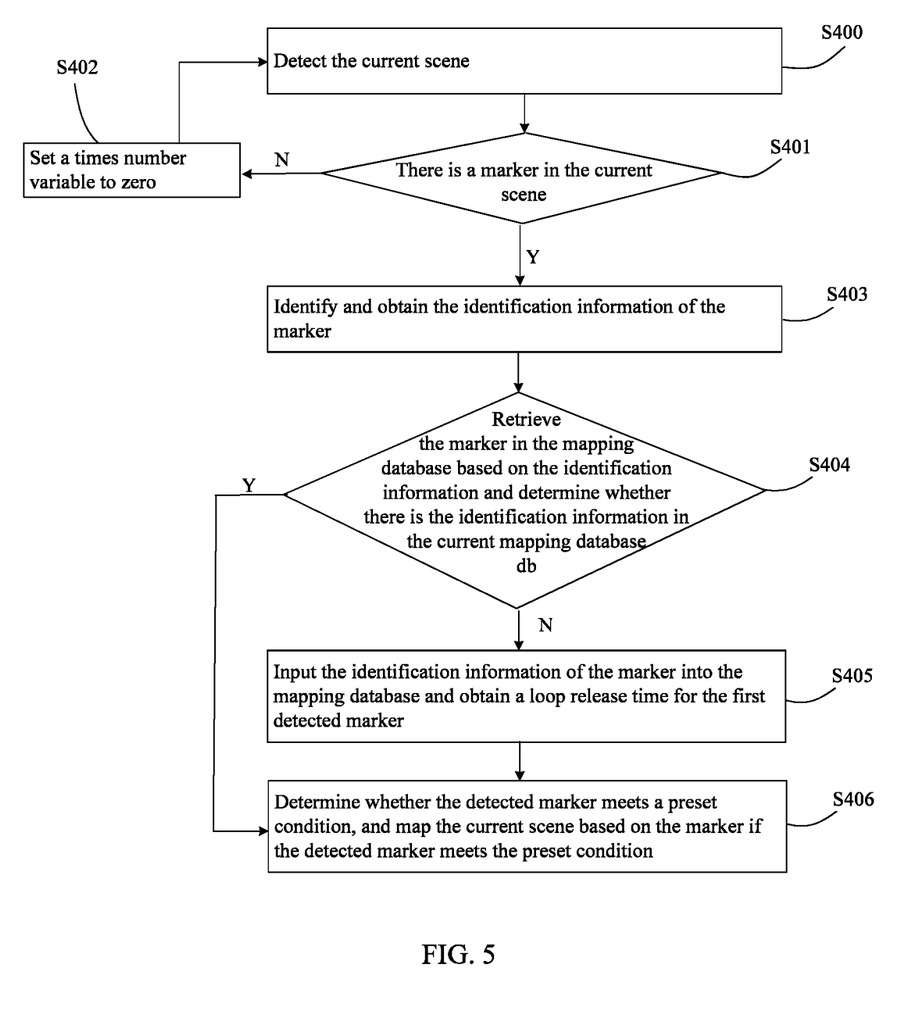
FIG. 5 is a flow chart of a third embodiment of a robot mapping method according to the present disclosure.

FIG. 5 is a flow chart of a third embodiment of a robot mapping method according to the present disclosure. In this embodiment, a mapping method for a robot is provided. As shown in FIG. 5, the method includes the following steps.

S400: detecting the current scene.

S401: determining whether there is a marker in the current scene.

In this embodiment, if there is no marker in the current scene, step S402 is executed; otherwise, step S403 is executed.

S402: setting a times number variable to zero.

In this embodiment, steps S400-S402 are the same as or similar to steps S300-S302 in the above-mentioned embodiment, respectively, and the same or similar technical effects can be achieved, which will not be repeated herein.

S403: identifying and obtaining the identification information of the marker.

In this embodiment, the identification method for identifying the identification information in the prior art can be referred to obtain the identification information of the marker, which will not be repeated herein.

S404: retrieving the marker in the mapping database based on the identification information and determining whether there is the identification information in the current mapping database db.

In this embodiment, a plurality of identification information is stored in the mapping database db. If the identification information can be searched in the current mapping database db, that is, there is the identification information in the current mapping database db, which indicates that it is not the first time for the robot to pass the corresponding position, and step S406 is executed; otherwise, if the identification information cannot be searched in the current mapping database db, that is, there is no identification information in the current mapping database db, which indicates that it is the first time for the robot to pass the corresponding position, then step S405 is executed.

S405: inputting the identification information of the marker into the mapping database and obtaining a loop release time for the first detected marker.

S406: determining whether the detected marker meets a preset condition, and mapping the current scene based on the marker if the detected marker meets the preset condition.

In this embodiment, steps S405-S406 are the same as or similar to steps S304-S305 in the above-mentioned embodiment, respectively, and the same or similar technical effects can be achieved, which will not be repeated herein.

In this embodiment, the robot mapping method detects the current scene and determines whether there is a marker in the current scene; if there is a marker in the current scene, it retrieves the marker in the mapping database based on the identification information and determines whether there is the identification information in the current mapping database db; if there is no identification information in the current mapping database db, it inputs the identification information of the marker into the mapping database db and obtains the loop release time for the first detected marker, determines whether the detected marker meets the preset condition, and maps the current scene based on the marker if the detected marker meets the preset condition. In this embodiment, the marker with the identification information can be identified by the robot in the current scene is detected and then the mapping is performed. Compared with the prior art that directly perform mapping on the current scene through a device equipped with, for example, laser or visional sensors, it is capable of effectively reducing the difficulty of loops and the number of false loops. In addition, because the above-mentioned method performs the loop processing after the detected marker meets the preset condition so as to map the current scene, which can effectively avoid the problem of frequent loops that causes the overload of the system of the robot and affects the quality of mapping, so that an environmental map of better quality can be built through the method, thereby providing a more accurate navigation and positioning service.

Figure 6:
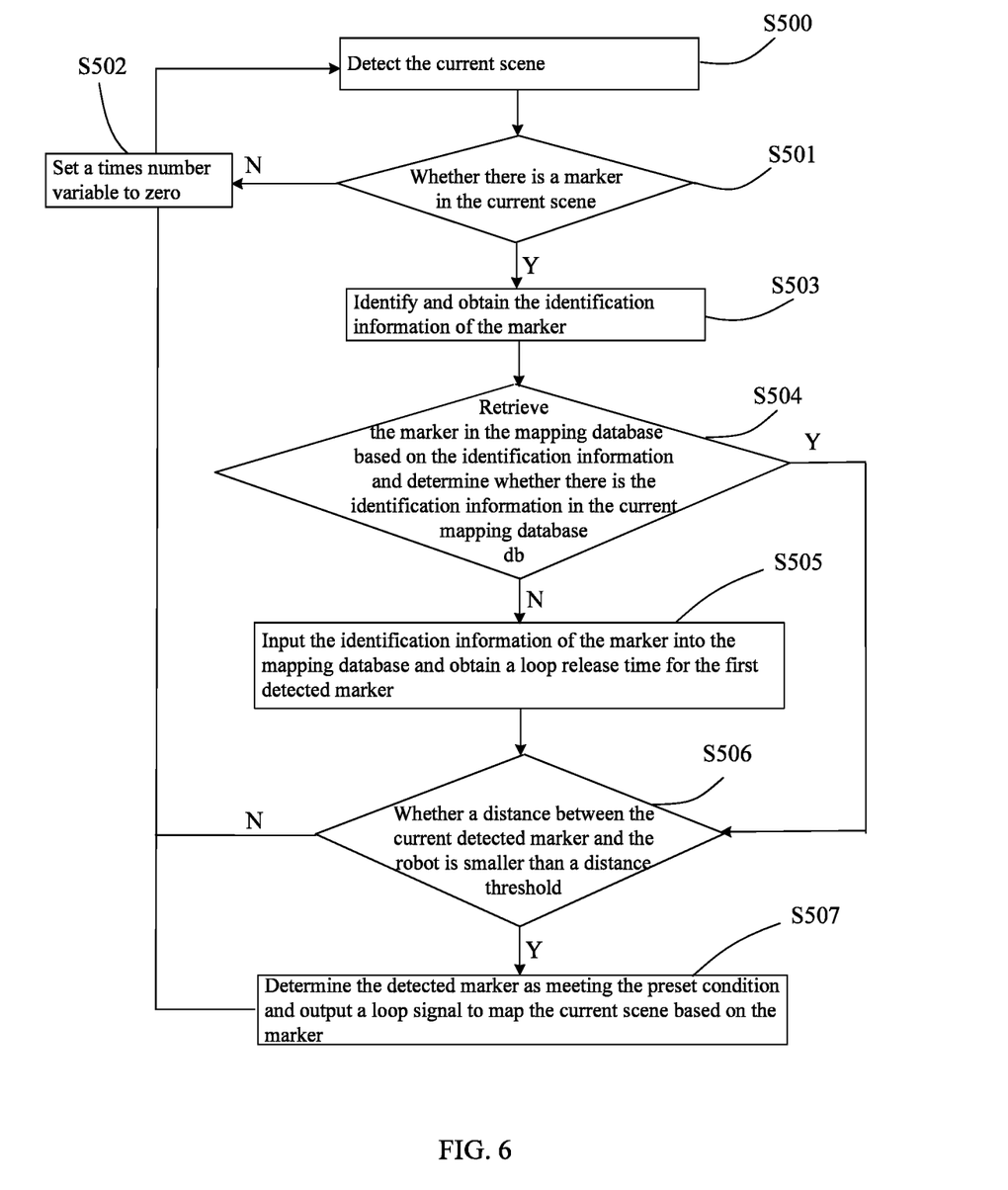
FIG. 6 is a flow chart of a fourth embodiment of a robot mapping method according to the present disclosure.

FIG. 6 is a flow chart of a fourth embodiment of a robot mapping method according to the present disclosure. In this embodiment, a mapping method for a robot is provided, where the preset condition involved in the mapping method is a distance condition. As shown in FIG. 6, the method includes the following steps.

S500: detecting the current scene.

S501: determining whether there is a marker in the current scene.

In this embodiment, if there is no marker, step S502 is executed; otherwise, step S503 is executed.

S502: setting a times number variable to zero.

In this embodiment, after the times number variable is set to zero, step S500 is re-executed.

S503: identifying and obtaining the identification information of the marker.

S504: retrieving the marker in the mapping database based on the identification information and determining whether there is the identification information in the current mapping database db.

In this embodiment, if there is the identification information in the current mapping database db, step S506 is executed; otherwise, step S505 is executed.

S505: inputting the identification information of the marker into the mapping database and obtaining a loop release time for the first detected marker.

In this embodiment, the above-mentioned steps S500-S505 are the same as or similar to the steps S400-S405 in the above-mentioned embodiment, respectively, and the same or similar technical effects can be achieved, which will not be repeated herein.

S506: determining whether a distance between the current detected marker and the robot is smaller than a distance threshold.

In the process of detecting the marker, the Euclidean distance between the marker and the robot is obtained at the same time, and then the Euclidean distance is compared with the distance threshold to determine whether the Euclidean distance between the marker and the robot is smaller than the distance threshold. If yes, step S507 is executed; otherwise, step S502 is executed.

In this embodiment, the Euclidean distance between the marker and the robot can be obtained through the method for measuring the Euclidean distance in the prior art. As an example, the distance threshold can be 2 meters.

S507: determining the detected marker as meeting the preset condition and outputting a loop signal to map the current scene based on the marker.

In this embodiment, when the detected markers successively meet the distance condition, the corresponding loop signal is output so as to map the current scene based on the marker. As an example, after mapping the scene where the marker located, it continues to execute step S500, and then re-detect the scene at other positions until the entire large scene where the robot located is mapped.

In this embodiment, the robot mapping method detects the marker with the identification information can be identified by the robot in the current scene and then performs mapping. Compared with the prior art that directly perform mapping on the current scene through a device equipped with, for example, laser or visional sensors, it is capable of effectively reducing the difficulty of loops and the number of false loops. In addition, because the above-mentioned method performs the loop processing after the detected marker meets the distance condition so as to map the current scene, which can effectively avoid the problem of frequent loops that causes the overload of the system of the robot and affects the quality of mapping, so that an environmental map of better quality can be built through the method, thereby providing a more accurate navigation and positioning service.

Figure 7:
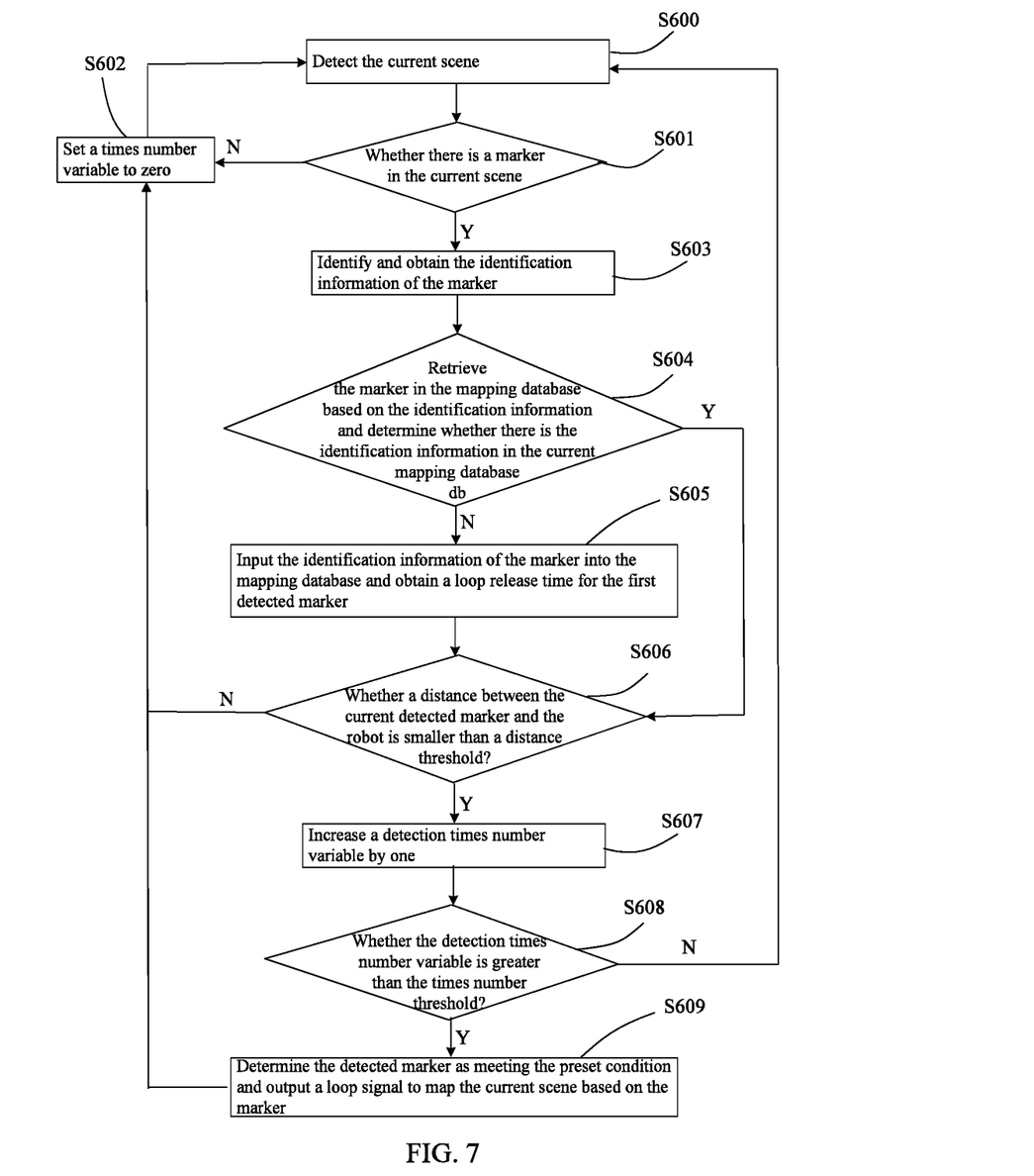
FIG. 7 is a flow chart of a fifth embodiment of a robot mapping method according to the present disclosure.

FIG. 7 is a flow chart of a fifth embodiment of a robot mapping method according to the present disclosure. In this embodiment, a mapping method for a robot is provided, where the preset condition involved in the mapping method is a times number condition. As shown in FIG. 7, the method includes the following steps.

S600: detecting the current scene.

S601: determining whether there is a marker in the current scene.

In this embodiment, if there is no marker, step S602 is executed; otherwise, step S603 is executed.

S602: setting a times number variable to zero.

In this embodiment, after the times number variable is set to zero, step S600 is re-executed.

S603: identifying and obtaining the identification information of the marker.

S604: retrieving the marker in the mapping database based on the identification information and determining whether there is the identification information in the current mapping database db.

In this embodiment, if there is the identification information in the current mapping database db, step S606 is executed; otherwise, step 6505 is executed.

S605: inputting the identification information of the marker into the mapping database and obtaining a loop release time for the first detected marker.

S606: determining whether a distance between the current detected marker and the robot is smaller than a distance threshold.

If yes, step S607 is executed; otherwise, step S602 is executed.

In this embodiment, the above-mentioned steps S600-S606 are the same as or similar to the steps S500-S506 in the fourth embodiment, respectively, and the same or similar technical effects can be achieved, which will not be repeated herein.

S607: increasing a detection times number variable by one.

S608: determining whether the detection times number variable is greater than the times number threshold.

In this embodiment, the detection times number variable refers to the number of consecutive detections that the distance between the marker and the robot is smaller than the distance threshold, where the times number threshold can be 3, that is, it determines whether the detection times number variable is greater than 3. If not, step S600 is executed; otherwise, step S609 is executed.

S609: determining the detected marker as meeting the preset condition and outputting a loop signal to map the current scene based on the marker.

In this embodiment, when the detected markers successively meet the distance condition, the corresponding loop signal is output to map the current scene based on the marker. As an example, after mapping the scene where the marker located, it continues to execute step S600, and then re-detect scenes at other locations until the entire large scene where the robot located is built.

In this embodiment, the robot mapping method detects the marker with the identification information can be identified by the robot in the current scene and then performs mapping. Compared with the prior art that directly perform mapping on the current scene through a device equipped with, for example, laser or visional sensors, it is capable of effectively reducing the difficulty of loops and the number of false loops. In addition, because the above-mentioned method performs the loop processing after the detected marker meets the times number condition so as to map the current scene, which can effectively avoid the problem of frequent loops that causes the overload of the system of the robot and affects the quality of mapping, so that an environmental map of better quality can be built through the method, thereby providing a more accurate navigation and positioning service. At the same time, since the times number condition is based on the distance condition, the frequency of the loop can be reduced to a greater extent than the scheme of performing loop processing to map the current scene after the detected marker meets the distance condition, so as to further avoid the problem of frequent loops which makes the system of the robot to overload and affects the quality of mapping, so that an environmental map of better quality can be built through the method, thereby providing a more accurate navigation and positioning service.

Figure 8:
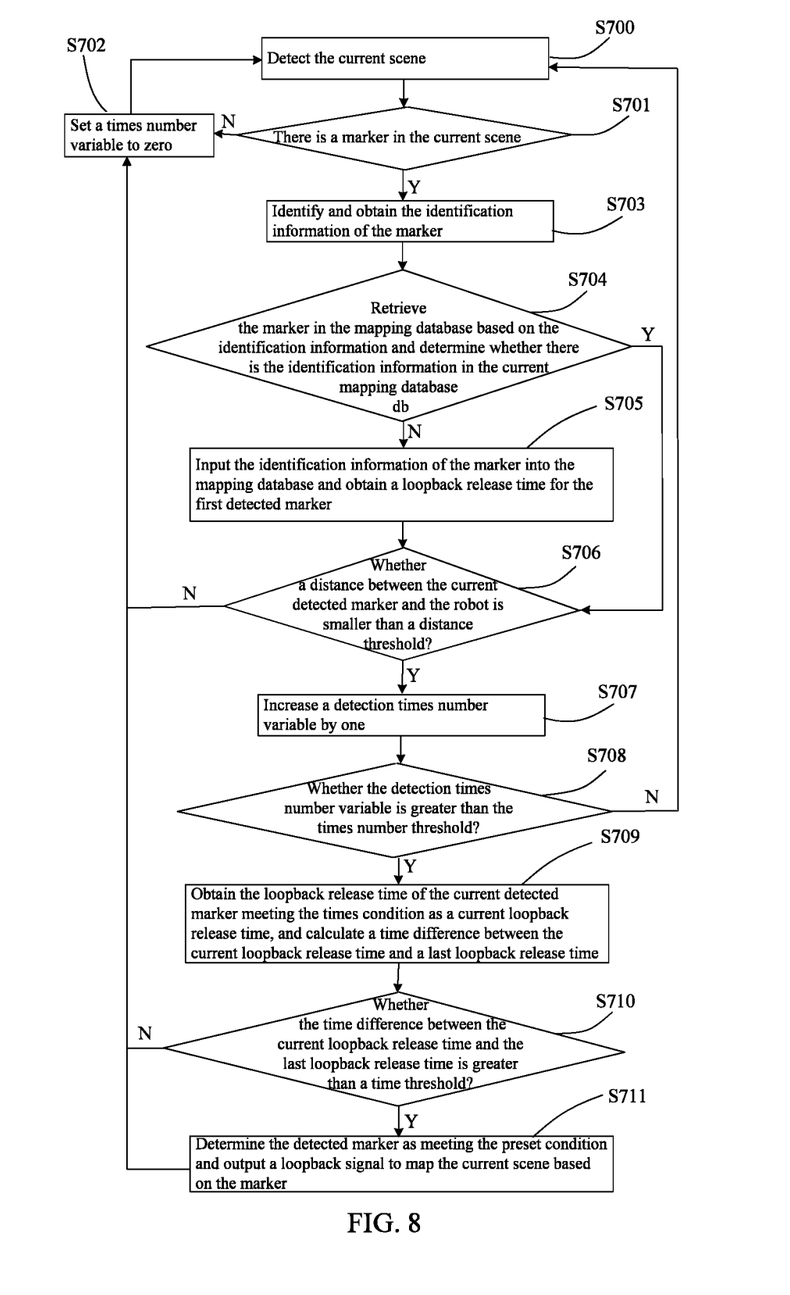
FIG. 8 is a flow chart of a sixth embodiment of a robot mapping method according to the present disclosure.

FIG. 7 is a flow chart of a sixth embodiment of a robot mapping method according to the present disclosure. In this embodiment, a mapping method for a robot is provided, where the preset condition involved in the mapping method is a times number condition. As shown in FIG. 8, the method includes the following steps.

S700: detecting the current scene.

S701: determining whether there is a marker in the current scene.

In this embodiment, if there is no marker, step S702 is executed; otherwise, step S703 is executed.

S702: setting a times number variable to zero.

In this embodiment, after the times number variable is set to zero, step S700 is re-executed.

S703: identifying and obtaining the identification information of the marker.

S704: retrieving the marker in the mapping database based on the identification information and determining whether there is the identification information in the current mapping database db.

In this embodiment, if there is the identification information in the current mapping database db, step S706 is executed; otherwise, step S705 is executed.

S705: inputting the identification information of the marker into the mapping database and obtaining a loop release time for the first detected marker.

S706: determining whether a distance between the current detected marker and the robot is smaller than a distance threshold.

In the process of detecting the marker, the Euclidean distance between the marker and the robot is obtained at the same time, and then the Euclidean distance is compared with the distance threshold to determine whether the Euclidean distance between the marker and the robot is smaller than the distance threshold. If yes, step S707 is executed; otherwise, step S702 is executed.

In this embodiment, the Euclidean distance between the marker and the robot can be obtained through the method for measuring the Euclidean distance in the prior art. As an example, the distance threshold can be 2 meters.

S707: increasing a detection times number variable by one.

S708: determining whether the detection times number variable is greater than the times number threshold.

In this embodiment, if not, step S700 is executed; otherwise, step S709 is executed.

In this embodiment, steps S700-S708 are the same as or similar to steps S600-S608 in the above-mentioned fifth embodiment, respectively, and the same or similar technical effects can be achieved, which will not be repeated herein.

S709: obtaining the loop release time of the current detected marker meeting the times condition as a current loop release time, and calculating a time difference between the current loop release time and a last loop release time.

It can be understood that, the current loop release time is the loop release time when the times number threshold is met this time.

S710: determining whether the time difference between the current loop release time and the last loop release time is greater than a time threshold.

In this embodiment, if the time difference between the current loop release time and the last loop release time is greater than the time threshold, step S711 is executed; if the time difference between the current loop release time and the last loop release time is smaller than or equal to the time threshold, step S702 is executed.

In this embodiment, the time threshold can be 300 seconds. As an example, if the last loop release time is 8:0:0 (8 hours, 0 minutes, and 0 seconds) and the current loop release time is 8:2:10, then the time difference between the current loop release time and the last loop release time is 2 minutes and 10 seconds, that is, 130 seconds. Because the time difference of 130 seconds is smaller than the time threshold of 300 seconds, step S702 is executed. As another example, if the last loop release time is 8:0:0, and the current loop release time is 8:5:10, then the time difference between the current loop release time and the last loop release time is 5 minutes and 10 seconds, that is, 310 seconds. Because the time difference of 310 seconds is greater than the time threshold of 300 seconds, step S711 is executed.

S711: determining the detected marker as meeting the preset condition and outputting a loop signal to map the current scene based on the marker.

In this embodiment, when the detected marker sequentially meets the distance condition, the times number condition, and the time condition, the corresponding loop signal is output to map the current scene based on the marker. At the same time, the last loop release field corresponding to the marker is updated to the current loop release time, which is the above-mentioned loop release time when the times number threshold is met. For example, in the above-mentioned embodiment, the involved last loop release time that meets the times number condition is 8:5:10, if the loop is at the first release, the last loop release time corresponding to the marker is updated from a system default value to 8:5:10. If the last loop release time that meets the times number condition for the second time is 8:12:10, then 8:510 is updated to 8:12:10. If the last loop release time that meets the times number condition for the third time is 8:18:10, then 8:12:10 seconds is updated to 8:18:10 seconds, and so on.

In the specific implementation process, after the scene where the marker located is mapped, it continues to execute step S702, and then re-detect the scenes of other positions until the entire large scene where the robot located is mapped.

In this embodiment, the robot mapping method detects the marker with the identification information can be identified by the robot in the current scene and then performs mapping. Compared with the prior art that directly perform mapping on the current scene through a device equipped with, for example, laser or visional sensors, it is capable of effectively reducing the difficulty of loops and the number of false loops. In addition, because the above-mentioned method performs the loop processing after the detected marker meets the time condition so as to map the current scene, which can effectively avoid the problem of frequent loops that causes the overload of the system of the robot and affects the quality of mapping, so that an environmental map of better quality can be built through the method, thereby providing a more accurate navigation and positioning service. At the same time, since the time condition is based on the distance condition and the times number condition, the frequency of the loop can be reduced to a greater extent than the scheme of performing loop processing to map the current scene after the detected marker meets the distance condition and the times number condition, so as to further avoid the problem of frequent loops which makes the system of the robot to overload and affects the quality of mapping, so that an environmental map of better quality can be built through the method, thereby providing a more accurate navigation and positioning service.

In addition, in this embodiment, the robot mapping method has high efficiency and accuracy, and can effectively reduce the difficulties and fails of loops in visual or laser mapping in large scenes such as supermarkets, airports, and computer rooms and in highly similar environments, so as to help to build a higher-quality environment map to provide accurate navigation and positioning services. In addition, the mapping method has the characteristics of strong versatility and good practicality.

Figure 9:
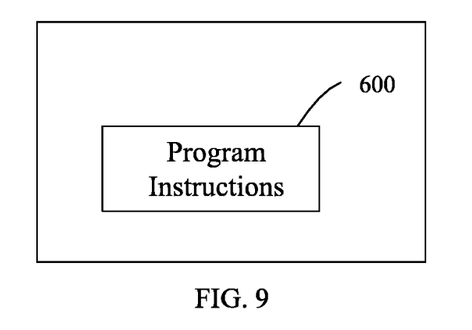
FIG. 9 is a schematic block diagram of an embodiment of a computer readable storage medium according to the present disclosure.

FIG. 9 is a schematic block diagram of an embodiment of a computer readable storage medium according to the present disclosure. In this embodiment, a non-transitory computer readable storage medium is provided. As shown in FIG. 29, the storage medium includes program instructions 600, and the program instructions 600 are called to execute the robot mapping method according to the above-mentioned embodiment.

In which, the instructions 600 can be stored in the above-mentioned storage medium in the form of software products, which includes a number of instructions for enabling a computer device (which can be a personal computer, a server, a network device, etc.) or a processor to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes, or a terminal device such as a computer, a server, a mobile phone, and a tablet.

In the embodiments provided by the present disclosure, it is to be understood that the disclosed system, and methods and can be implemented in other ways. For example, the device embodiments described above are merely illustrative; the division of the units is merely a division of logical functions, and can be divided in other ways such as combining or integrating multiple units or components with another system when being implemented; and some features can be ignored or not executed. In another aspect, the coupling such as direct coupling and communication connection which is shown or discussed can be implemented through some interfaces, and the indirect coupling and the communication connection between devices or units can be electrical, mechanical, or otherwise.

In addition, each of the functional units in each of the embodiments of the present disclosure can be integrated in one processing unit. Each unit can be physically exists alone, or two or more units can be integrated in one unit. The above-mentioned integrated unit can be implemented either in the form of hardware, or in the form of software functional units.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented mapping method for a robot, comprising steps of:
   detecting a marker in a current scene through a visual sensor of the robot, wherein the marker has identification information capable of being identified by the robot;
   identifying the identification information of the marker, and retrieving the marker in a mapping database based on the identification information;
   determining the detected marker as a first detected marker, inputting the identification information of the marker into the mapping database and obtaining a system default value as a loop release time of the first detected marker, in response to the identification information being not retrieved from the mapping database;
   determining whether the detected marker meets a preset condition; and
   mapping the current scene based on the marker, in response to the detected marker meeting the preset condition.

2. The method of claim 1, wherein the preset condition comprises at least one of a distance condition, a times number condition, and a time condition.

3. The method of claim 1, wherein the step of determining whether the detected marker meets the preset condition comprises:
   determining whether a distance between the current detected marker and the robot is smaller than a distance threshold;
   determining the detected marker as meeting the preset condition and outputting a loop signal to map the current scene based on the marker through a signal emitter of the robot, in response to the distance between the detected marker and the robot being smaller than the distance threshold; and
   setting a detection times number variable of the marker to zero and returning to the step of detecting the marker in the current scene, in response to the distance between the detected marker and the robot being not smaller than the distance threshold.

4. The method of claim 1, wherein the step of determining whether the detected marker meets the preset condition comprises:
   determining whether a detection times number variable of the marker meeting a distance condition being greater than a times number threshold;
   determining the detected marker as meeting the preset condition and outputting a loop signal to map the current scene based on the marker, in response to the detection times number variable of the marker meeting the distance condition being greater than the times number threshold; and
   setting a detection times number variable of the marker to zero and returning to the step of detecting the marker in the current scene, in response to the detection times number variable of the marker meeting the distance condition being not greater than the times number threshold.

5. The method of claim 1, wherein the step of determining whether the detected marker meets the preset condition comprises:
   obtaining a loop release time of the current detected marker meeting a times condition as a current loop release time, and calculating a time difference between the current loop release time and a last loop release time;
   determining whether the time difference between the current loop release time and the last loop release time is greater than a time threshold;
   determining the detected marker as meeting the preset condition and outputting a loop signal to map the current scene based on the marker, in response to the time difference between the current loop release time and the last loop release time is greater than the time threshold; and
   setting a detection times number variable of the marker to zero and returning to the step of detecting the marker in the current scene, in response to the time difference between the current loop release time and the last loop release time is not greater than the time threshold.

6. The method of claim 1, wherein the identification information is one of an identification code and an identification signal.

7. The method of claim 1, further comprising:
   in response to the identification information being retrieved from the mapping database, determining whether the detected marker meets the preset condition, and in response to the detected marker meeting the preset condition, mapping the current scene based on the marker.

8. The method of claim 1, wherein when the detected marker is not the first detected marker, the loop release time of the detected marker indicates a time of a system of the robot releasing a loop to a laser or a visual SLAM after the detected marker is determined to meet the preset conditions.

9. A non-transitory computer readable storage medium storing instructions executable on a processor, and the instructions comprise:
   instructions for detecting a marker in a current scene through a visual sensor of the robot, wherein the marker has identification information capable of being identified by the robot;
   instructions for identifying the identification information of the marker, and retrieving the marker in a mapping database based on the identification information; and
   instructions for determining the detected marker as a first detected marker, inputting the identification information of the marker into the mapping database and obtaining a system default value as a loop release time of the first detected marker, in response to the identification information being not retrieved from the mapping database;
   instructions for determining whether the detected marker meets a preset condition; and
   instructions for mapping the current scene based on the marker, in response to the detected marker meeting the preset condition.

10. The storage medium of claim 9, wherein the instructions for determining whether the detected marker meets the preset condition comprise:
    instructions for determining whether a distance between the current detected marker and the robot is smaller than a distance threshold;
    instructions for determining the detected marker as meeting the preset condition and outputting a loop signal to map the current scene based on the marker through a signal emitter of the robot, in response to the distance between the detected marker and the robot being smaller than the distance threshold; and instructions for setting a detection times number variable of the marker to zero and returning to the step of detecting the marker in the current scene, in response to the distance between the detected marker and the robot being not smaller than the distance threshold.

11. The storage medium of claim 9, wherein the instructions for determining whether the detected marker meets the preset condition comprise:

instructions for determining whether a detection times number variable of the marker meeting a distance condition being greater than a times number threshold;

instructions for determining the detected marker as meeting the preset condition and outputting a loop signal to map the current scene based on the marker, in response to the detection times number variable of the marker meeting the distance condition being greater than the times number threshold; and instructions for setting a detection times number variable of the marker to zero and returning to the step of detecting the marker in the current scene, in response to the detection times number variable of the marker meeting the distance condition being not greater than the times number threshold.

12. The storage medium of claim 9, wherein the instructions for determining whether the detected marker meets the preset condition comprises:

instructions for obtaining a loop release time of the current detected marker meeting a times condition as a current loop release time, and calculating a time difference between the current loop release time and a last loop release time;

instructions for determining whether the time difference between the current loop release time and the last loop release time is greater than a time threshold;

instructions for determining the detected marker as meeting the preset condition and outputting a loop signal to map the current scene based on the marker, in response to the time difference between the current loop release time and the last loop release time is greater than the time threshold; and instructions for setting a detection times number variable of the marker to zero and returning to the step of detecting the marker in the current scene, in response to the time difference between the current loop release time and the last loop release time is not greater than the time threshold.

13. The storage medium of claim 9, wherein the preset condition comprises at least one of a distance condition, a times number condition, and a time condition.

14. The storage medium of claim 9, wherein the identification information is one of an identification code and an identification signal.

15. A robot with mapping functions, comprising:
a memory;
a processor;
a visual sensor; and
one or more computer programs stored in the memory and executable on the processor;
wherein the one or more computer programs comprise:
instructions for detecting a marker in a current scene through the visual sensor, wherein the marker has identification information capable of being identified by the robot;

instructions for identifying the identification information of the marker, and retrieving the marker in a mapping database based on the identification information; and instructions for determining the detected marker as a first detected marker, inputting the identification information of the marker into the mapping database and obtaining a system default value as a loop release time of the first detected marker, in response to the identification information being not retrieved from the mapping database;

instructions for determining whether the detected marker meets a preset condition; and instructions for mapping the current scene based on the marker, in response to the detected marker meeting the preset condition.

16. The robot of claim 15, wherein the robot further comprises a signal emitter, and the instructions for determining whether the detected marker meets the preset condition comprise:

instructions for determining whether a distance between the current detected marker and the robot is smaller than a distance threshold;

instructions for instructions for determining the detected marker as meeting the preset condition and outputting a loop signal to map the current scene based on the marker through the signal emitter, in response to the distance between the detected marker and the robot being smaller than the distance threshold; and instructions for setting a detection times number variable of the marker to zero and returning to the step of detecting the marker in the current scene, in response to the distance between the detected marker and the robot being not smaller than the distance threshold.

17. The robot of claim 15, wherein the instructions for determining whether the detected marker meets the preset condition comprise:

instructions for determining whether a detection times number variable of the marker meeting a distance condition being greater than a times number threshold;

instructions for determining the detected marker as meeting the preset condition and outputting a loop signal to map the current scene based on the marker, in response to the detection times number variable of the marker meeting the distance condition being greater than the times number threshold; and instructions for setting a detection times number variable of the marker to zero and returning to the step of detecting the marker in the current scene, in response to the detection times number variable of the marker meeting the distance condition being not greater than the times number threshold.

18. The robot of claim 15, wherein the instructions for determining whether the detected marker meets the preset condition comprise:

instructions for obtaining a loop release time of the current detected marker meeting a times condition as a current loop release time, and calculating a time difference between the current loop release time and a last loop release time;

instructions for determining whether the time difference between the current loop release time and the last loop release time is greater than a time threshold;

instructions for determining the detected marker as meeting the preset condition and outputting a loop signal to map the current scene based on the marker, in response to the time difference between the current loop release time and the last loop release time is greater than the time threshold; and instructions for setting a detection times number variable of the marker to zero and returning to the step of detecting the marker in the current scene, in response to the time difference between the current loop release time and the last loop release time is not greater than the time threshold.

19. The robot of claim 15, wherein the preset condition comprises at least one of a distance condition, a times number condition, and a time condition.

20. The robot of claim 15, wherein the identification information is one of an identification code and an identification signal.

* * * * *